US012273671B2

(12) United States Patent
Cantabery

(10) Patent No.: US 12,273,671 B2
(45) Date of Patent: Apr. 8, 2025

(54) MODULARIZED LOUDSPEAKER SYSTEM EXTERIOR AESTHETIC

(71) Applicant: Fredrick Lane Cantabery, Conway, AR (US)

(72) Inventor: Fredrick Lane Cantabery, Conway, AR (US)

( * ) Notice: Subject to any disclaimer, the term of this patent is extended or adjusted under 35 U.S.C. 154(b) by 0 days.

(21) Appl. No.: 17/582,933

(22) Filed: Jan. 24, 2022

(65) Prior Publication Data

US 2023/0239600 A1 Jul. 27, 2023

(51) Int. Cl.
*H04R 1/02* (2006.01)

(52) U.S. Cl.
CPC ......... *H04R 1/02* (2013.01); *H04R 2201/025* (2013.01); *H04R 2201/029* (2013.01)

(58) Field of Classification Search
CPC ................ H04R 1/02; H04R 2201/025; H04R 2201/029; H04R 1/023; H04R 1/2876
USPC .......................................................... 381/332
See application file for complete search history.

(56) References Cited

U.S. PATENT DOCUMENTS 4,926,962 A * 5/1990 Graham .................. B29C 44/10 181/150
6,056,083 A * 5/2000 Daniell .................... H04R 5/02 D14/207
6,142,254 A * 11/2000 Claybaugh ............. H04R 1/023 181/141
6,321,871 B1 * 11/2001 Russell ..................... E04B 1/86 181/290
8,090,137 B2 * 1/2012 Ryan ...................... H04R 1/023 381/391
9,036,858 B1 * 5/2015 Reeves .................. H04R 1/023 381/386
2003/0048912 A1 * 3/2003 Reich ....................... H04R 1/02 381/124
2005/0008187 A1 * 1/2005 Ito ......................... H04R 1/2888 381/386
2007/0056796 A1 * 3/2007 Marlowe .................. H04R 5/02 181/148
2008/0310094 A1 * 12/2008 Burns ................... G06F 1/1616 361/679.01
2011/0192854 A1 * 8/2011 Chen .................. B65D 21/0202 220/660

(Continued)

FOREIGN PATENT DOCUMENTS

ES 1061410 U * 2/2006

*Primary Examiner* — Paul Kim

(57) ABSTRACT

A loudspeaker system comprising a design and methodology is disclosed that provides for the ongoing customization of a loudspeaker's exterior aesthetic incorporating graphics and artwork including those that can be customer defined. High quality graphics and other artwork are incorporated onto decorative panels that are made of various solid, semi-solid, non acoustically transparent material whose artwork and design aesthetic can be customer defined The panels are easily attached/detached to the peripheral sides of the loudspeaker housing, not covering the vibrating membranes, utilizing quick release mechanisms that require no framework, and as such do not compromise sound quality. The panels either separately or combined can have their own unique artistic aesthetic and are fabricated utilizing additive manufacturing techniques as well as cutting, shearing and forming techniques, among others.

12 Claims, 6 Drawing Sheets

(56) References Cited

U.S. PATENT DOCUMENTS

| | | | | |
|---|---|---|---|---|
| 2013/0306399 A1* | 11/2013 | Swan | ..................... | H04R 1/026<br>181/199 |
| 2016/0366775 A1* | 12/2016 | Kolton | ................... | H05K 11/00 |
| 2022/0339962 A1* | 10/2022 | Winters | ................. | A63H 3/006 |

* cited by examiner

MODULARIZED LOUDSPEAKER SYSTEM EXTERIOR AESTHETIC

The present invention relates to loudspeaker housings for audio reproduction and in particular that of the use of aesthetic decorative panels that allows for the ongoing customization of a loudspeaker exterior through graphic and artwork applications including those that can be customer defined. The invention also concerns methods for fabricating the aesthetic decorative panels and the loudspeaker housing using additive manufacturing techniques and, cutting, shearing, and forming techniques, for easily and quickly attaching/detaching the aesthetic panels to a loudspeaker housing without compromising sound propagation and sound quality.

BACKGROUND

Audio companies both past and present have made offerings/products that allow a customer to select a certain exterior aesthetic/finish. These typically have involved a limited selection of veneers, paint finishes or other industrial coatings that are permanently attached/adhered to the exterior of the product. These selections have not addressed an important need in allowing each individual customer to customize the product to their own personal taste by providing a modular design that allows: 1) The customer to select from an almost endless palette of high quality graphics, color combinations, or personalized artwork/images, along with unlimited options of various solid/semi solid base materials (metal, plastic, wood, etc.) that can be incorporated into the design aesthetic 2) The design aesthetic to be changed within seconds through a modular approach utilizing easily detachable/attachable solid decorative panels that adhere to the exterior of the product in a non-permanent manner. And 3) The quality of the sound propagation from the radiating drivers to be unimpeded and maintained in its original form.

A decorative cover is disclosed in U.S. Pat. No. 6,142,254 entitled Decorative Speaker Cover issued to Claybaugh, et al. The design requires a material that can be stretched across a complex frame work which then requires the framework itself to be mounted to the loudspeaker enclosure. The cover surrounds the enclosure in all/much of its periphery including the loudspeaker radiating drivers themselves compromising the sound of the loudspeaker.

A speaker made of sculpted materials is disclosed in U.S. Pat. No. 4,926,962 entitled Decorative Speaker Cover issued to Graham whose intent is for the color and texture of the speaker cover to conceal the radiating surface of the loudspeaker driver and enable it to blend in the with the surface of a wall or ceiling which with it is attached, However, the design covers the radiating surface of the loudspeaker driver, which as in the case of Claybaugh, will compromise the sound of the loudspeaker.

Neither of the above patents noted or any other reference disclose a loudspeaker enclosure aesthetic that does not cover the loudspeaker drivers with a fabric of some form or manner compromising the sound of the loudspeaker. The present invention does not cover any radiating surfaces while mitigating the effects of resonance in the loudspeaker through the addition of another alienating barrier on the outside surface of the loudspeaker. Additionally, the present invention allows for a wide variety of non-acoustically transparent materials in panel form to be utilized in creating the aesthetic which are very easily and quickly attached and detached.

BRIEF SUMMARY OF THE INVENTION

The present invention is a loudspeaker design and methodology that provides for the customization of a loudspeaker's exterior aesthetic that allows for ongoing and potentially endless graphic and artwork applications including those that can be customer defined. Panels are made of various solid/semi-solid/non acoustically transparent material whose artwork and/or design aesthetic can be customer defined for each individual unit/product. The panels either separately or combined can have their own unique size, shape and artistic image/aesthetic. The panels are designed such that they require no framework and directly attach to the peripheral (sides, front/back, top, etc) of the enclosure while not covering the vibrating membranes/speaker drivers.

The present invention also includes methods for attaching and detaching the panels to the loudspeaker enclosure wherein the panels are modular, incorporating different shapes and sizes, and can be easily removed and changed within seconds.

It is an object of the invention to create a loudspeaker design aesthetic that provides for a wide variety of materials and finishes to be incorporated into a multimedia piece of artwork onto the exterior of the loudspeaker.

It is an object of the invention to make a loudspeaker deign aesthetic that allows for the quick change of the aesthetic through the attaching and detaching of panels to the loudspeaker enclosure.

DETAILED DESCRIPTION AND BEST MODE OF IMPLEMENTATION

Figure 1:
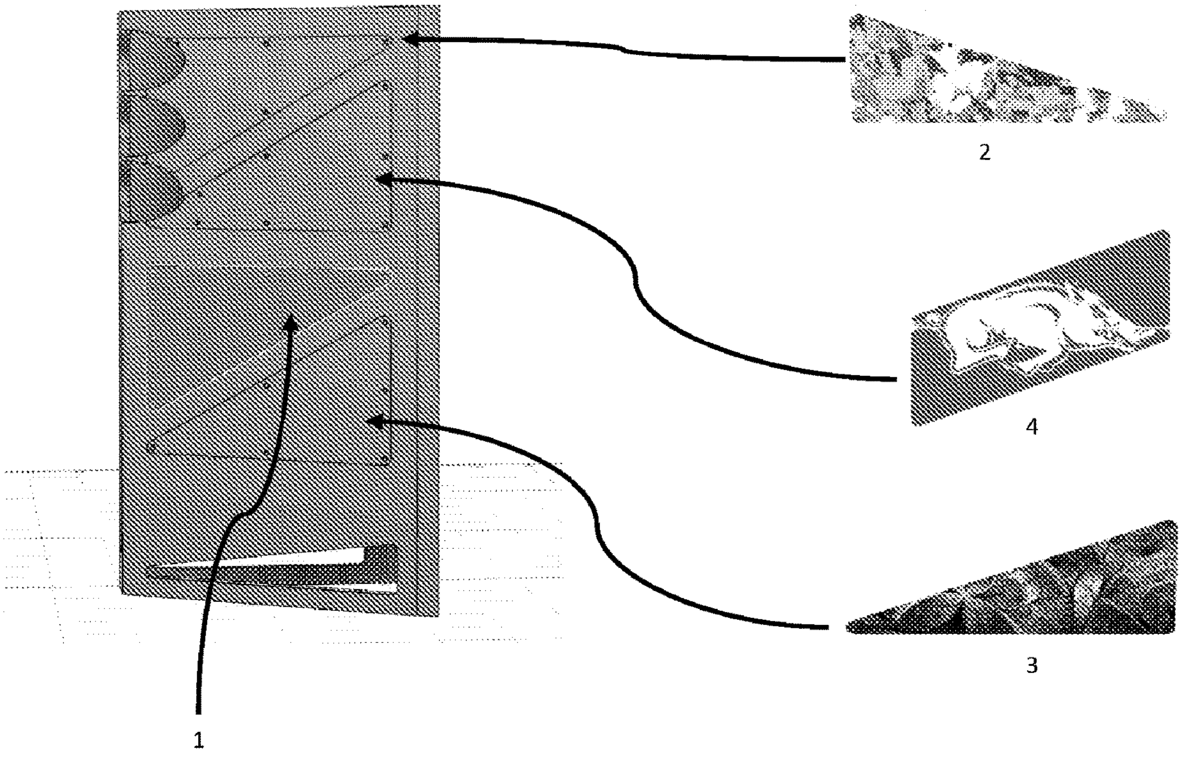
FIG. 1 shows a larger floor standing loudspeaker system with recessed side cutouts for mounting various artistic panels along with an example of panels with artwork that can be mounted.

FIG. 1 shows a floor standing loudspeaker system with examples of aesthetic panels in a triangular shape as described in the present invention. A loudspeaker exterior surface (1) is recessed to provide the mounting of the aesthetic panel flush with the exterior surface of the loudspeaker. While not necessary for functionality, the flush or recessed mount of the panel adds to the aesthetic of the design. Examples of aesthetic panels 2,3,4 in a triangular shape are shown. Practically any shape can be incorporated into the presented invention as intended and multiple panels can be integrated to form a single image as shown in panel 4. Panel artwork and images, if chosen by the customer, can be placed onto a panel utilizing a number of different processes including but not limited to direct to panel printing, sublimation printing, hand painting, etc. Metal panels may be selected by the customer based upon their aesthetic properties and include copper, brass, steel, aluminum, etc. Wood panels may be selected by the customer based upon their aesthetic properties and include any variety of woods either in their natural state or processed to enhanced their surface qualities. Various other materials can come into play as well such as papers, plastics, and composites.

Figure 2:
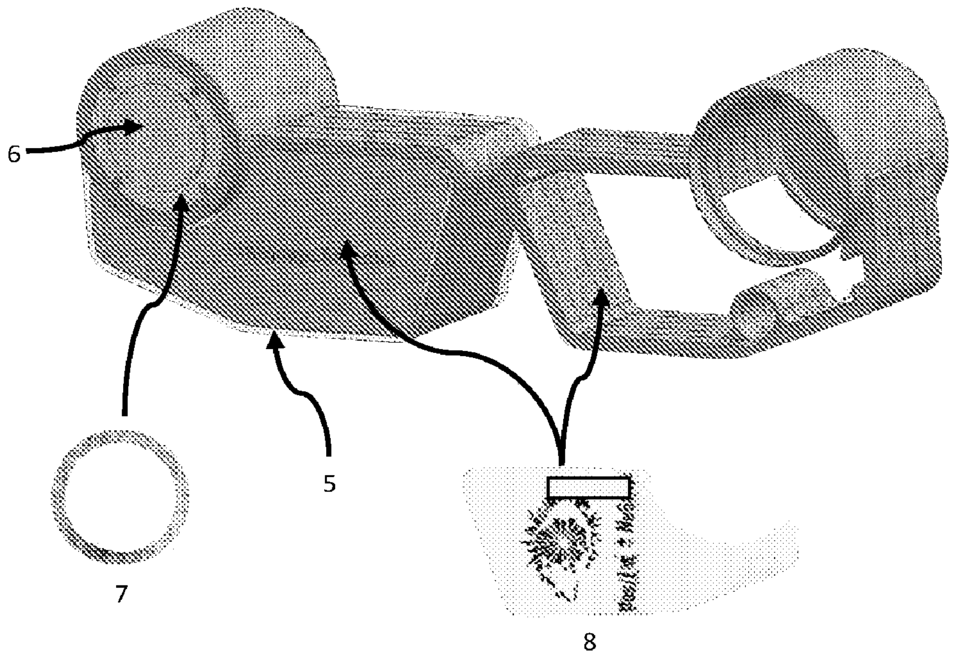
FIG. 2 illustrates a smaller bookshelf/portable loudspeaker system with the full front of the enclosure recessed for mounting various artistic panels along with an example of a panel with artwork that is to be mounted.

FIG. 2 shows a bookshelf/stand mount/portable loudspeaker system (5) with examples of aesthetic panels (8) in a polygonal shape integral to the loudspeaker exterior surface and a circular/ring shape panel (7) serving as a trim ring surrounding the loudspeaker driver (6) itself as described in the present invention. The loudspeaker exterior surface (5) as described in FIG. 1 is recessed to provide the mounting of the aesthetic panel flush with the exterior surface of the loudspeaker and the surround trim ring surround. While not necessary for functionality, the flush mount of the panel adds to the aesthetic of the design. Panels artwork and images as described in FIG. 1 can be placed onto a panel utilizing a number of different materials and processes as described in the present invention.

Figure 3:
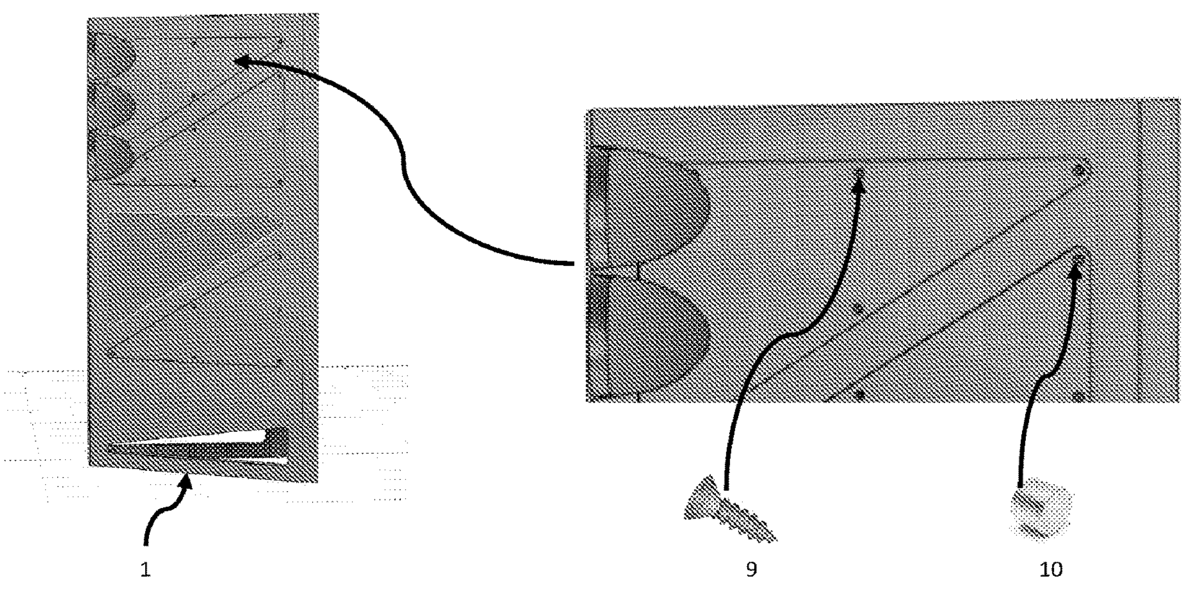
FIG. 3 presents a closeup view of the larger floor standing loudspeaker exterior showing holes for mounting hardware options including magnets or ferromagnetic materials, in this case screws.

FIG. 3 shows the floor standing loudspeaker system as described in FIG. 1 with a closeup view showing hole locations for mounting either magnets (10) or ferromagnetic base materials (9), in this case a screw, in a pattern depending upon the shape of the panel to provide adequate support of the panel once attached to the exterior of the loudspeaker system (1), (5). The present invention is designed so that either ferromagnetic materials or magnets can be imbedded into the exterior of the loudspeaker system with a corresponding thin magnet or thin ferromagnetic disk mounted to the aesthetic panels.

Figure 4:
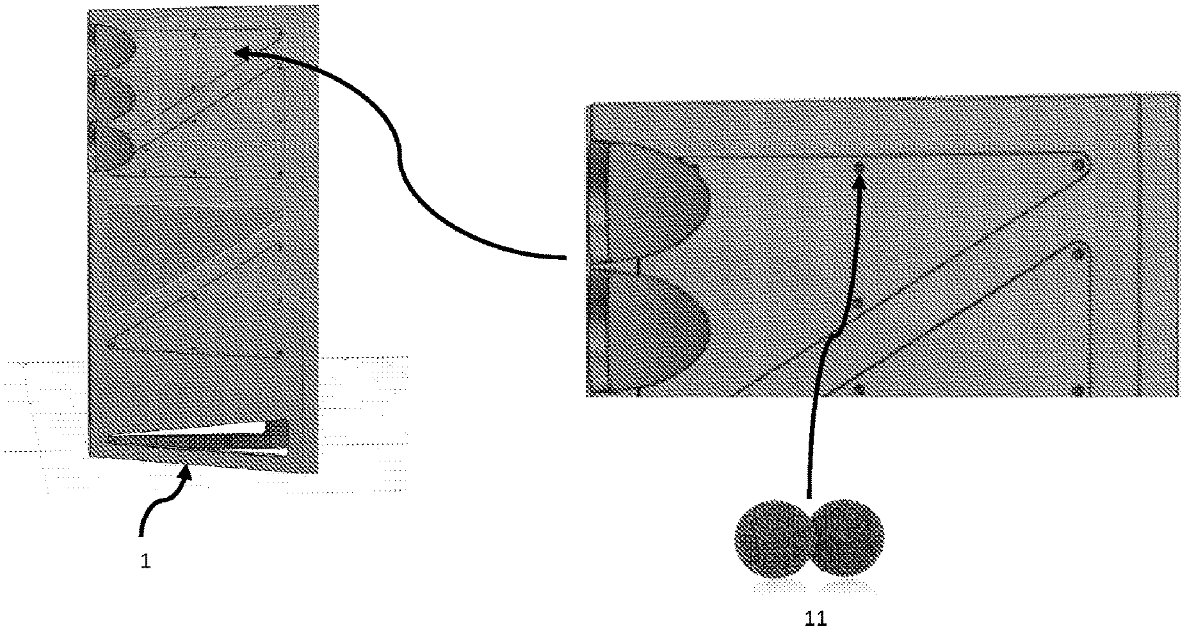
FIG. 4 presents a closeup view of the larger floor standing loudspeaker exterior showing adhesive backed hook and loop fasteners attached to the loudspeaker exterior.

FIG. 4 shows the floor standing loudspeaker system as described in FIG. 1 with a closeup view showing locations for surface mounting hook and loop adhesive backed fasteners (11) to the exterior of the loudspeaker system in a pattern depending upon the shape of the panel to provide adequate support of the panel once attached to the exterior of the loudspeaker system (1), (5). The present invention is designed so that either the hook or loop surface can be adhered onto the exterior of the loudspeaker system or to the aesthetic panels.

Figure 5:
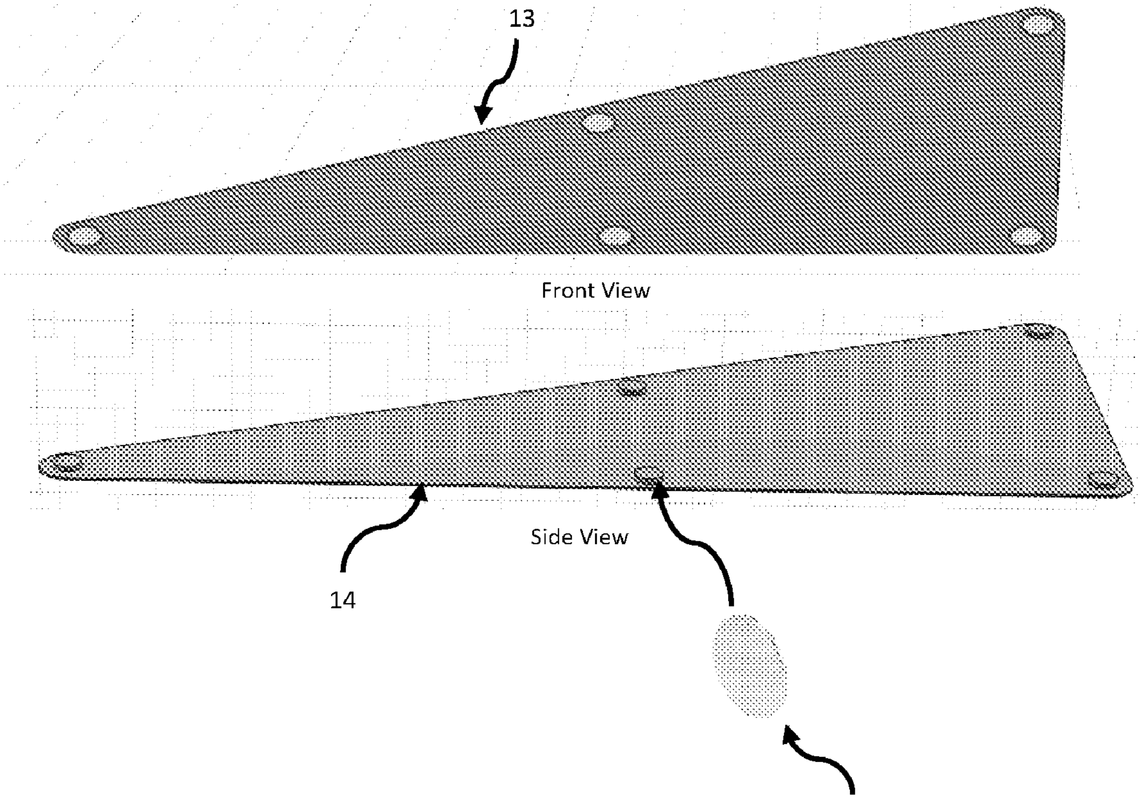
FIG. 5 presents a closeup view of the loudspeaker exterior aesthetic panel showing thin neodymium magnets or thin ferromagnetic disks that are attached with an adhesive.

FIG. 5 shows two views of an aesthetic panel including a front view (13) and a side view (14). The side view portrays multiple thin magnets or thin ferromagnetic disks (15) that are adhered to the aesthetic panel in some pattern depending upon the shape of the panel to provide adequate support of the panel once attached to the exterior of the loudspeaker system (1), (5).

Figure 6:
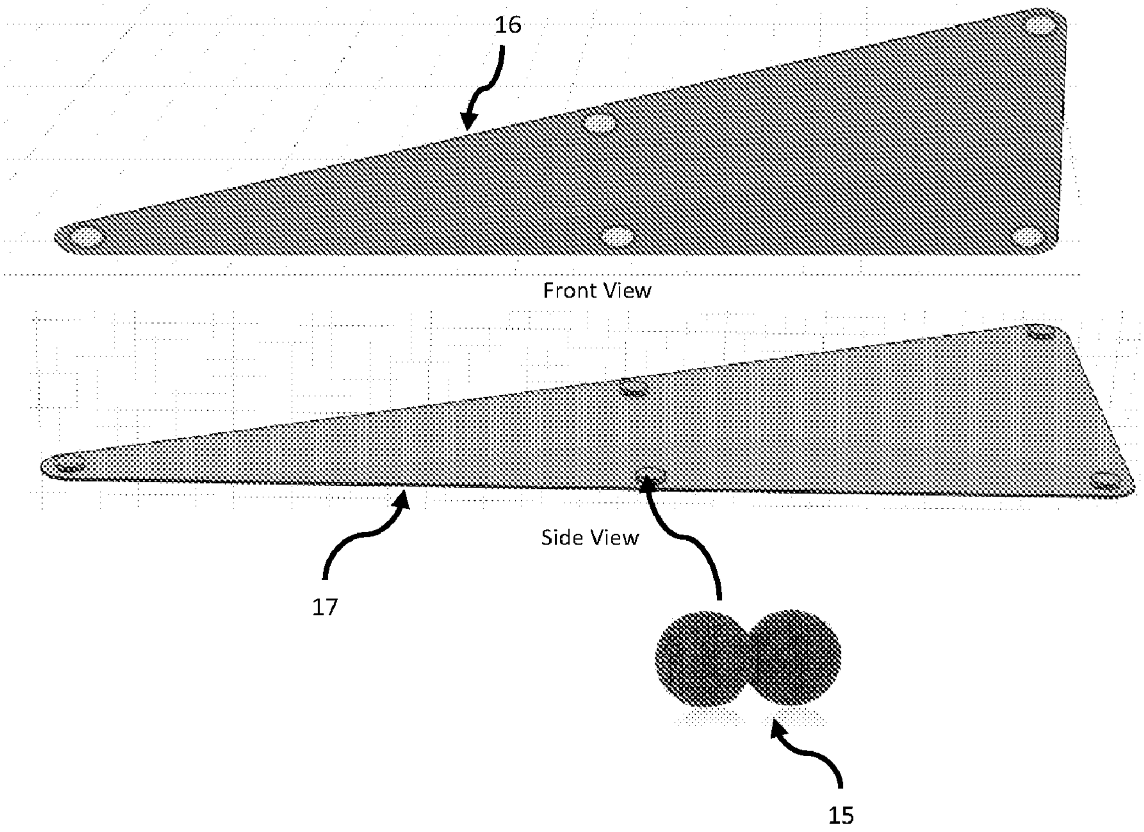
FIG. 6 presents a closeup view of the loudspeaker exterior aesthetic panel showing adhesive backed hook and loop fasteners attached to the aesthetic panels.

FIG. 6 shows two views of an aesthetic panel including a front view (16) and a side view (17). The side view portrays multiple hook or loop fasteners (15) that are adhered to the aesthetic panel in some pattern depending upon the shape of the panel to provide adequate support of the panel once attached to the exterior of the loudspeaker system (1), (5).

It is understood that every aspect of the present invention has not been described explicitly. therefore, modifications of the invention that are explicitly described are fully comprehended by the spirit of the invention and the scope of the claims as set forth.

What is claimed is:

1. A detachable panel for a loudspeaker system, comprising:

a decorative element integrated therein or arranged thereon;

wherein the decorative element is selected from a group of:

patterns, textures, colors, and materials;

wherein the decorative element comprises an aesthetic design integrated within and/or onto the detachable panel;

wherein the aesthetic design comprises at least one of:

generically sourced graphics and artwork, specially created graphics and artwork, customer defined graphics and artwork, or a combination thereof; and wherein the decorative element is further integrated into or arranged upon the detachable panel utilizing at least one of:

direct-to-panel printing, sublimation printing, three-dimensional printing, ultraviolet (UV) printing, manually generated artwork, or a combination thereof; and an attachment mechanism to simply, easily and quickly attach and detach a plurality of the detachable panels onto a surface of the loudspeaker system without the need for a complex framework;

wherein the attachment mechanism is selected from a group comprising: magnetic coupling, hook and loop fastener, snap fit fastener, and slide and lock fastener; and wherein the detachable panel as required is made of a flexible material allowing it to conform to a curved portion on a surface of the loudspeaker system.

2. The detachable panel of claim 1, wherein the detachable panel comprises a first surface and an opposing second surface, and wherein the decorative element is integrated in or arranged on at least one of the first surface and the second surface.

3. The detachable panel of claim 2, wherein the first surface is arranged to face the loudspeaker system and the decorative element is integrated in or arranged on the second surface of the detachable panel.

4. The detachable panel of claim 1, wherein the detachable panel is made of at least one of: a solid material, a semi-solid material, a non-acoustically transparent material, or a combination thereof.

5. The detachable panel of claim 1, wherein the loudspeaker system comprises one or more vibrating driver elements for transmitting acoustic signals, and wherein the detachable panel is arranged on the surface such that the vibrating driver elements of the loudspeaker system are not covered in any way by the detachable panel thus not affecting the sound propagation.

6. The detachable panel of claim 1, wherein the detachable panel is made of at least one of: metal, wood, plastic, cloth, paper, wood veneers and composite materials.

7. The detachable panel of claim 1, wherein the detachable panel is manufactured or constructed using a group of techniques comprising: additive manufacturing techniques as well as, cutting, shearing and forming.

8. A loudspeaker system comprising:

a housing having peripheral sides, a front, a back, a top, and vibrating membranes/speaker drivers for sound propagation; and the detachable panel of claim 1.

9. The loudspeaker system of claim 8, wherein the detachable panel is made of at least one of: a solid material, a semi-solid material, a non-acoustically transparent material, or a combination thereof.

10. The loudspeaker system of claim 8, wherein the detachable panel comprises a first surface and an opposing second surface, and wherein the decorative element is integrated into or arranged onto at least the first surface or second surface.

11. The loudspeaker system of claim 10, wherein the first surface is arranged to face the housing and the decorative element is integrated into or onto the second surface of the detachable panel.

12. The loudspeaker system of claim 8, wherein the detachable panel is fabricated using additive manufacturing techniques as well as, cutting, shearing and forming.

* * * * *